Dec. 10, 1946.   L. JASPER   2,412,338
METHOD FOR PLUCKING FOWL
Original Filed Nov. 13, 1940
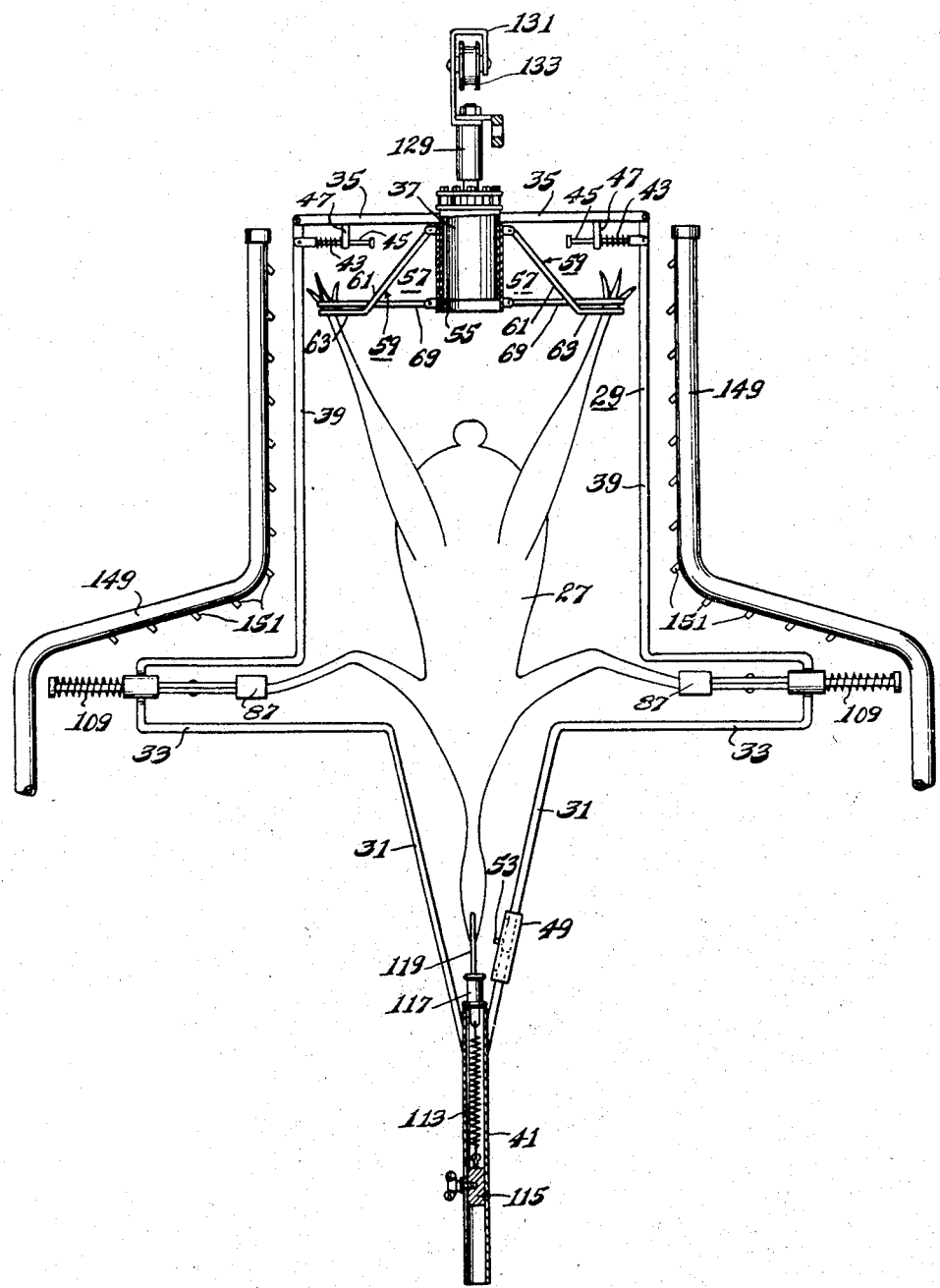
INVENTOR.
Lenus Jasper,
BY Baird & Freeman
Atty's.

Patented Dec. 10, 1946

2,412,338

UNITED STATES PATENT OFFICE 2,412,338

METHOD FOR PLUCKING FOWL

Lenus Jasper, Orland, Calif., assignor to Seth S. Barker, Ottumwa, Iowa

Original application November 13, 1940, Serial No. 365,439. Divided and this application April 17, 1945, Serial No. 588,859

6 Claims. (Cl. 17—45)

My invention relates to the plucking of fowl, and more particularly to a method for accomplishing such result.

Among the objects of my invention are to provide an improved method for the removal of feathers from fowl by use of a liquid, such as water.

Additional objects of my invention will be brought out in the following description of the same, taken in conjunction with the accompanying drawing wherein the figure is an elevational view of a fowl and water supply means whereby my method may be used.

This is a division from my application, Serial No. 365,439, filed November 13, 1940.

In its broadest aspects, my invention accomplishes the removal of feathers from fowl by subjecting the bird to a sustained flow of fluid, preferably water, at high velocity sufficient to effect removal of the feathers therefrom. The invention, preferably, involves some preliminary step to facilitate the removal of the feathers in this manner. For example, in preparation for the removal of the feathers, I prefer to treat the bird to relax and soften the feather follicles, and this may be accomplished in any suitable manner, such as exposing the bird to a bath of hot water, though I prefer to utilize the same apparatus which directs the high velocity fluid against the body of the bird to effect removal of the feathers, and thereby effect economies in both time and cost. In using this apparatus to perform this preliminary step, I direct against the bird a stream of liquid, such as water, at high temperature but at a reduced pressure, and continue the same for a brief period of time sufficient to accomplish the desired relaxing and softening of the feather follicles. The apparatus is arranged so that both the preliminary step, and the final step of removing the feathers are accomplished most efficiently in sequentially timed operations. Practically all the feathers may thus be removed, except for possibly some of the more strongly embedded tail and wing feathers which may subsequently and conveniently be plucked by hand.

My method may be practiced, for example, with apparatus such as shown in the drawing.

A fowl suspension frame is designed to follow the general contour of a bird 27 with its wings outstretched, and includes an upper, substantially rectangular section 29, a lower section 31 of V-shape, and oppositely directed intermediate wing sections 33. The upper, substantially rectangular portion includes a pair of horizontally disposed bars 35 anchored to a suspension cylinder 37 adjacent a closed end thereof. The vertical sections 39 of this rectangular portion are hinged at the extremities of the horizontal bars 35 and joined to the wing portions 33 of the frame.

The V-shaped portion 31 terminates at its apex in a vertically disposed tube 41. One side of the V-shaped portion is split, enabling both sides of the frame to swing on their respective hinges, and spreading of the frame, in the absence of any restraining force, is assured by spreading means disposed in each of the corners of the rectangular portion of the frame. Each of such spreading means comprises a compression spring 43 disposed about a rod 45 which is hinged to the vertical side member 39 of the rectangular section, and passes through a lug 47 depending from the adjacent horizontal bar 35. The frame may be retained against such spreading, when in use, by means of a locking tube 49 disposed about one end of the split portion, and having a longitudinal slot therein to receive a guide pin 53.

Telescopically disposed about the suspension cylinder 37 is another cylinder 55 to which are attached a pair of leg clamps 57. Each of such legs clamps includes a strip 59 of metal pivotally secured at the upper portion of its supporting cylinder. This strip is bent at an intermediate point, to provide an angularly disposed section 61 and an adjoining end section 63.

A second element of the clamp comprises a straight strip 69 of metal pivotally secured to the clamp supporting cylinder 55 at a point below the point of attachment of the first member 59 and operatively associated with part 63.

The further details of the leg clamps and the means for adjusting them are disclosed in my application above mentioned, and are not essentially pertinent to this application.

In each of the wing portions of the frame, there is a wing clamp 87.

In the tube 41 at the apex of the V-section of the frame, there is disposed a spring 113 anchored to an adjustable block 115 in the lower portion of the tube. The upper end of the spring connects to a spool 117 under tension. The spool spans the upper end of the tube and carries a hook 119. This mechanism constitutes a head grip for engaging the head of a fowl when a fowl is suspended in the frame.

The fowl frame is pivotally suspended from a conveyor, not shown, by a member 129 which has integrally extending therefrom in an upward direction, a bracket 131 for receiving a track roller 133. This roller is adapted to engage and ride upon a track forming part of the conveyor.

In suspending a fowl in the frame, the legs are first positioned in the leg clamps. The head of the bird may be fixed against swinging or other movement, by engaging the hook 119 in the lower mandible of the bird, against the tensioning effect of the spring 113. One of the wings may then be gripped by one of the wing clamps 87 and similarly the second wing may be gripped by the other wing clamp, the springs 109 associated with these clamps tending to tension the wings and hold them in outstretched position.

For applying jets of water to the birds, I provide pipes 149 which follow closely the contour of a fowl frame, particularly above the wing sections thereof. The pipes are perforated and fitted with nozzles 151 pointing in a generally downward direction so as to cover the entire length of a bird suspended in a frame and caused to pass between a pair of such upright pipe members.

As many water supply pipes may be provided as are necessary.

During the travel of the fowl frame around the conveyor with a bird suspended therein, the bird is exposed to, first, the preliminary treatment for relaxing and softening the feather follicles, and secondly, to the feather removal treatment. In the course of the preliminary treatment, the bird is exposed to a spray of hot water at low velocity from the nozzles 151, while during the actual removal of the feathers, the bird is then subjected to water, preferably at a lower temperature but at a considerably higher velocity. Inasmuch as the preliminary step need involve but a small portion of the total time of travel around the carrier, the apparatus is designed to automatically shift from the preliminary treatment to the subsequent step at the proper time during movement of the frame about the carrier, at the same time changing the water temperature and velocity in accordance with the requirements of each step.

To accomplish such mode of operation, I provide two sources of supply (not shown), one of which provides water at high temperature, preferably of the order of 125° F. and at relatively low pressure, of the order of 75 lbs., while the other source of supply furnishes water, preferably at a pressure of the order of 150 lbs. per square inch, but at a lower temperature than the first supply, somewhere of the order of 85° F. These pressures and temperatures are cited as illustrative only, and are not critical, though the pressure of the water from the second supply source must be sufficiently high to strike the bird with a velocity sufficient to bring about a removal of the feathers. Means for supplying liquid need not otherwise be shown.

The travel of the water will preferably be against the grain of the feathers.

It will thus be apparent that the objects as set forth by me are fully realized. While I have disclosed my apparatus in great detail, it will be apparent that the same may be subject to modification and alteration, without departing from the spirit thereof, and I, therefore, do not desire to be limited in my protection to the details disclosed and described, except as may be necessitated by the appended claims.

I claim as my invention:

1. A method of defeathering fowls consisting of directing streams of water at high velocity against said fowls.

2. A method of defeathering fowls, which consists of subjecting the fowls to water at a predetermined temperature, and thereafter directing streams of water at high velocity against said fowls.

3. The method of plucking fowl comprising supporting said fowl against substantial displacement and forcing a fluid medium in the direction of said fowl at a velocity sufficient to remove feathers therefrom.

4. The method of plucking fowl comprising supporting said fowl against substantial displacement and forcing a fluid medium against the grain of the feathers of said fowl at a velocity sufficient to remove feathers therefrom.

5. The method of plucking fowl comprising suspending said fowl against substantial lateral displacement, directing a liquid at elevated temperature and at relatively low velocity against said fowl and for a period of time sufficient to soften and relax the feather follicles, and then forcing a fluid against said fowl at a lower temperature but at a higher velocity sufficient to remove the feathers therefrom.

6. The method of plucking fowl comprising supporting said fowl against substantial movement, exposing the same to a liquid at an elevated temperature to relax and soften the feather follicles, directing a fluid medium at said fowl and against the grain of the feathers at a high velocity sufficient to detach feathers from the body of said fowl, and rotating said fowl to successively expose different portions of the body thereof to said high velocity fluid medium.

LENUS JASPER.